United States Patent
McMillan et al.

(10) Patent No.: US 7,265,512 B2
(45) Date of Patent: Sep. 4, 2007

(54) ACTUATOR WITH FEEDBACK FOR END STOP POSITIONING

(75) Inventors: Scott D. McMillan, Golden Valley, MN (US); Robert J. Sibilski, Ramsey, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/162,125

(22) Filed: Aug. 30, 2005

(65) Prior Publication Data

US 2007/0046236 A1    Mar. 1, 2007

(51) Int. Cl.
*G05B 1/06*    (2006.01)

(52) U.S. Cl. .................. 318/663; 318/626; 318/286

(58) Field of Classification Search ............. 318/565, 318/626, 640, 663, 286, 466–468; 388/907.5, 388/909
See application file for complete search history.

(56) References Cited

U.S. PATENT DOCUMENTS

| | | | |
|---|---|---|---|
| 3,579,072 A * | 5/1971 | Plummer et al. ........... 318/609 |
| 3,937,974 A | 2/1976 | Lafuze | |
| 3,959,702 A | 5/1976 | Godwin et al. | |
| 4,027,216 A | 5/1977 | Rozek | |
| 4,038,589 A | 7/1977 | Heyne et al. | |
| 4,139,807 A | 2/1979 | Hucker | |
| 4,295,085 A | 10/1981 | Lafuze | |
| 4,311,950 A | 1/1982 | Goldin et al. | |
| 4,315,202 A | 2/1982 | Dawson et al. | |
| 4,337,821 A * | 7/1982 | Saito ........................ 165/202 |
| 4,364,004 A | 12/1982 | Bourbeau | |
| 4,364,111 A * | 12/1982 | Jocz ........................... 361/175 |
| 4,393,597 A | 7/1983 | Picard et al. | |
| 4,422,028 A | 12/1983 | Godwin et al. | |
| 4,424,472 A * | 1/1984 | Jacot-Descombes et al. ....................... 318/568.13 |
| 4,434,932 A * | 3/1984 | Hara et al. ................. 236/49.3 |
| 4,456,166 A * | 6/1984 | Kagohata ..................... 236/13 |
| 4,501,155 A | 2/1985 | Garritano | |
| 4,530,395 A * | 7/1985 | Parker et al. ............... 165/208 |
| 4,546,293 A | 10/1985 | Peterson et al. | |
| 4,591,773 A * | 5/1986 | Numata ...................... 318/663 |
| 4,591,774 A | 5/1986 | Ferris et al. | |
| 4,591,775 A | 5/1986 | Niissel et al. | |
| 4,608,527 A | 8/1986 | Glennon et al. | |

(Continued)

OTHER PUBLICATIONS

"Current Loop Control of a Brushless DC Motor with Hall Sensors Using the ADMC401," Analog Devices Inc., 19 pages, Oct. 2001.

(Continued)

*Primary Examiner*—Bentsu Ro

(57) ABSTRACT

Methods for operating an actuator including providing a position sensor and using the position sensor to provide end-stop functionality for the actuator. The actuator may have a motor controlled by control circuitry, with the control circuitry reading a variable from a position sensor to determine when the motor should be deactivated due to an associated actuated part reaching a motion limit. Also, actuators including a position sensor, a motor, and control circuitry. The control circuitry may take an output from the position sensor and use the position sensor output to determine when to shut off the electric motor due to its encountering a motion limit, providing end stop functionality with reduced complexity and wear. Further embodiments include HVAC dampers and valves for use in controlling gas, steam, water, or other liquid or fluid flow.

1 Claim, 5 Drawing Sheets

U.S. PATENT DOCUMENTS

| | | |
|---|---|---|
| 4,618,808 A | 10/1986 | Ish-Shalom et al. |
| 4,651,068 A | 3/1987 | Meshkat-Razavi |
| 4,656,410 A | 4/1987 | Shibata |
| 4,659,973 A | 4/1987 | Stich |
| 4,701,839 A | 10/1987 | McNally et al. |
| 4,704,569 A | 11/1987 | Mallick, Jr. et al. |
| 4,720,792 A * | 1/1988 | Kasai et al. ............ 701/102 |
| 4,751,438 A | 6/1988 | Markunas |
| 4,818,908 A | 4/1989 | Tamae et al. |
| 4,825,138 A | 4/1989 | Platzer et al. |
| 4,835,448 A | 5/1989 | Dishner et al. |
| 4,839,579 A | 6/1989 | Ito et al. |
| 4,841,202 A | 6/1989 | Dishner et al. |
| 4,888,533 A | 12/1989 | Gotoh et al. |
| 4,897,583 A | 1/1990 | Rees |
| 4,937,508 A | 6/1990 | Rozman |
| 4,939,441 A | 7/1990 | Dhyanchand |
| 4,949,021 A | 8/1990 | Rozman et al. |
| 5,029,263 A | 7/1991 | Rozman |
| 5,038,062 A | 8/1991 | Shiraki |
| 5,047,681 A | 9/1991 | Gaillard et al. |
| 5,053,688 A | 10/1991 | Rees |
| 5,053,689 A | 10/1991 | Woodson et al. |
| 5,097,189 A | 3/1992 | Ito et al. |
| 5,113,125 A | 5/1992 | Stacey |
| 5,153,493 A * | 10/1992 | Jornod et al. ............ 318/609 |
| 5,168,202 A | 12/1992 | Bradshaw et al. |
| 5,200,661 A | 4/1993 | Shramo et al. |
| 5,202,610 A | 4/1993 | Frye et al. |
| 5,274,315 A | 12/1993 | Finocchi |
| 5,384,527 A | 1/1995 | Rozman et al. |
| 5,406,186 A | 4/1995 | Fair |
| 5,416,397 A | 5/1995 | Mazzara et al. |
| 5,416,652 A | 5/1995 | Lewis |
| 5,420,492 A | 5/1995 | Sood et al. |
| 5,425,165 A | 6/1995 | Shramo et al. |
| 5,428,470 A | 6/1995 | Labriola, II |
| 5,430,362 A | 7/1995 | Carr et al. |
| 5,449,986 A | 9/1995 | Dozor |
| 5,450,999 A | 9/1995 | Scholten et al. |
| 5,461,293 A | 10/1995 | Rozman et al. |
| 5,488,286 A | 1/1996 | Rozman et al. |
| 5,493,200 A | 2/1996 | Rozman et al. |
| 5,495,162 A | 2/1996 | Rozman et al. |
| 5,495,163 A | 2/1996 | Rozman et al. |
| 5,519,546 A | 5/1996 | Lewis |
| 5,565,750 A | 10/1996 | Padgett |
| 5,567,874 A | 10/1996 | Suzuki et al. |
| 5,587,641 A | 12/1996 | Rozman |
| 5,594,322 A | 1/1997 | Rozman et al. |
| 5,619,085 A | 4/1997 | Shramo |
| 5,656,911 A | 8/1997 | Nakayama et al. |
| 5,677,605 A | 10/1997 | Cambier et al. |
| 5,710,755 A | 1/1998 | Chen |
| 5,740,880 A | 4/1998 | Miller |
| 5,760,707 A | 6/1998 | Katagiri |
| 5,767,643 A | 6/1998 | Pham et al. |
| 5,777,447 A | 7/1998 | Okano |
| 5,793,180 A | 8/1998 | Maiocchi et al. |
| 5,796,194 A | 8/1998 | Archer et al. |
| 5,798,596 A | 8/1998 | Lordo |
| 5,814,962 A * | 9/1998 | Mizumoto ............ 318/600 |
| 5,850,130 A | 12/1998 | Fujisaki et al. |
| 5,859,518 A | 1/1999 | Vitunic |
| 5,874,796 A | 2/1999 | Petersen |
| 5,912,542 A | 6/1999 | Zalesski |
| 5,912,543 A | 6/1999 | Mahr et al. |
| 5,923,728 A | 7/1999 | Ikkai et al. |
| 5,964,455 A | 10/1999 | Catanzarite et al. |
| 5,986,419 A | 11/1999 | Archer et al. |
| 5,990,643 A | 11/1999 | Holling et al. |
| 5,995,710 A | 11/1999 | Holling et al. |
| 6,002,234 A | 12/1999 | Ohm et al. |
| 6,049,194 A | 4/2000 | Nakagawa et al. |
| 6,075,332 A | 6/2000 | McCann |
| 6,078,158 A | 6/2000 | Heeren et al. |
| 6,114,827 A | 9/2000 | Alvaro |
| 6,181,091 B1 | 1/2001 | Heeren et al. |
| 6,222,333 B1 | 4/2001 | Garnett et al. |
| 6,236,179 B1 | 5/2001 | Lawler et al. |
| 6,246,232 B1 | 6/2001 | Okumura |
| 6,271,641 B1 | 8/2001 | Yasohara et al. |
| 6,307,336 B1 | 10/2001 | Goff et al. |
| 6,310,450 B1 | 10/2001 | Arrigo |
| 6,313,601 B1 | 11/2001 | Kubo et al. |
| 6,324,085 B2 | 11/2001 | Kimura et al. |
| 6,367,337 B1 | 4/2002 | Schlabach |
| 6,373,211 B1 | 4/2002 | Henry et al. |
| 6,407,524 B1 | 6/2002 | Endo et al. |
| 6,508,072 B1 | 1/2003 | Kanazawa et al. |
| 6,524,209 B2 | 2/2003 | Ito et al. |
| 6,549,871 B1 | 4/2003 | Mir et al. |
| 6,577,097 B2 | 6/2003 | Krefta et al. |
| 6,580,235 B2 | 6/2003 | Laurent |
| 6,605,912 B1 | 8/2003 | Bharadwaj et al. |
| 6,626,002 B1 | 9/2003 | Notohara et al. |
| 6,631,781 B2 | 10/2003 | Williams et al. |
| 6,647,329 B2 | 11/2003 | Kleinau et al. |
| 6,683,427 B2 | 1/2004 | Desbiolles et al. |
| 6,686,713 B2 | 2/2004 | Desbiolles et al. |
| 6,694,287 B2 | 2/2004 | Mir et al. |
| 6,732,438 B2 | 5/2004 | Enzinna |
| 6,741,048 B2 | 5/2004 | Desbiolles et al. |
| 6,801,011 B2 | 10/2004 | Ide |
| 6,812,667 B2 | 11/2004 | Yasohara et al. |
| 6,826,499 B2 | 11/2004 | Colosky et al. |
| 6,828,752 B2 | 12/2004 | Nakatsugawa et al. |
| 6,828,919 B1 | 12/2004 | Gold |
| 6,900,607 B2 | 5/2005 | Kleinau et al. |
| 6,900,613 B2 | 5/2005 | Hirono |
| 6,911,794 B2 | 6/2005 | Maslov et al. |
| 6,914,399 B2 | 7/2005 | Kushion et al. |
| 2005/0127861 A1 | 6/2005 | McMillan et al. |

OTHER PUBLICATIONS

"SimpleServo Technical Section," 19 pages, prior to filing date of present application.

http://en.wikipedia.org/wiki/Brushless_Motor, "Brushless DC Electric Motor," Wikipedia, the Free Encyclopedia, 2 pages, printed Aug. 4, 2005.

http://www.drbrushless.com/articles/advuni/, "Advanced Unipolar PWM Technique," 2 pages, printed Aug. 12, 2005.

http://www.drbrushless.com/articles/dcbctheory/, "DC Brushless Commutation Theory Basics," 1 page, printed Aug. 12, 2005.

http://www.drbrushless.com/articles/smartini/, "Smart Position Initialization Procedure for Sinusoidal Brushless Motor with Incremental Encoder with Hall Sensors in the Presence of Load Torque," 3 pages, printed Aug. 12, 2005.

* cited by examiner

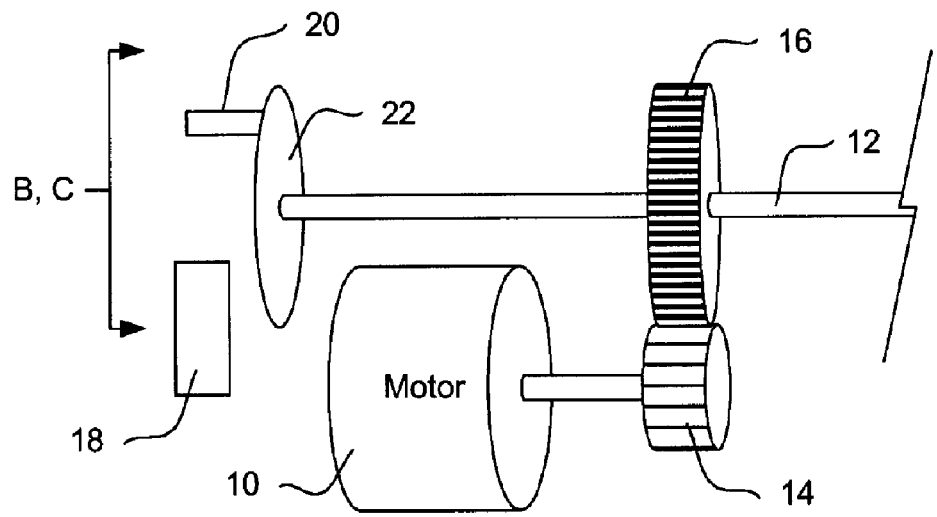
PRIOR ART
FIG. 1A
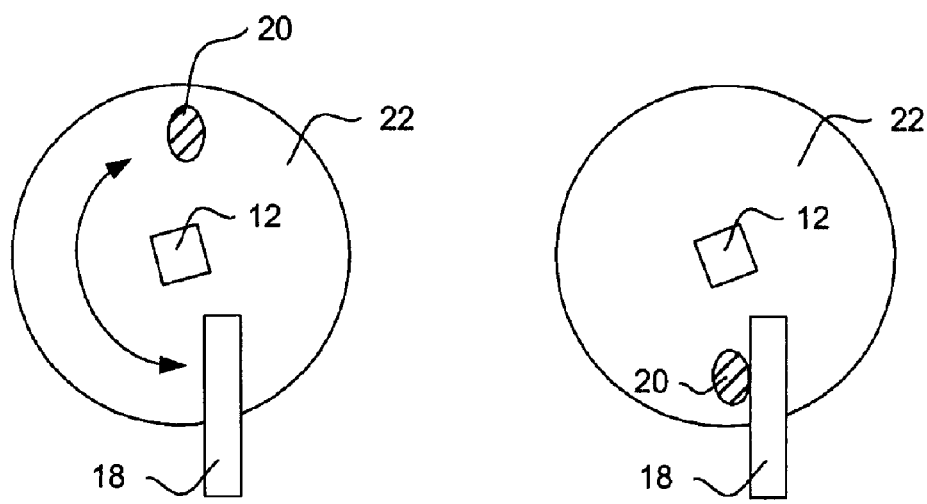
PRIOR ART
FIG. 1B
PRIOR ART
FIG. 1C

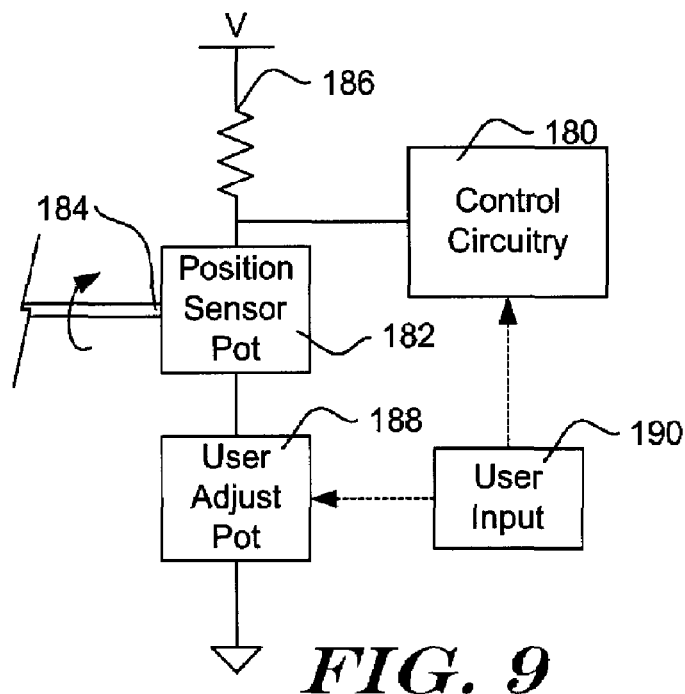
FIG. 9
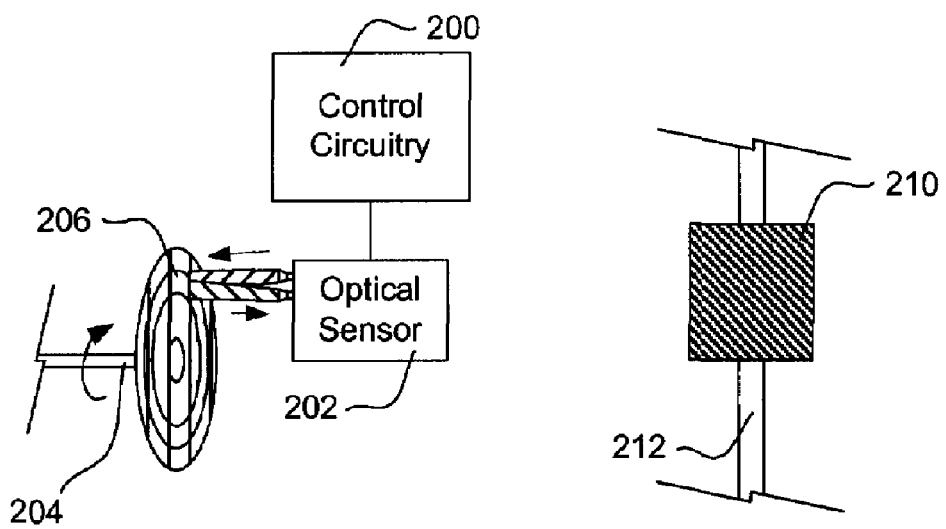
FIG. 10A  FIG. 10B

ACTUATOR WITH FEEDBACK FOR END STOP POSITIONING

FIELD

The present invention is related to the field of actuators. More particularly, the present invention is related to the field of actuators for opening/closing valves, dampers, and the like.

BACKGROUND

FIG. 1A illustrates a typical device for actuating a valve, damper or the like. An electric motor 10 is coupled to a drive shaft 12 by gears 14, 16. Also coupled to a drive shaft is a mechanical end stop including a stopper 18 disposed relative to an attachment 20 that is secured via disk 22 to the drive shaft 12. As shown by FIGS. 1B-1C, as the drive shaft 12 rotates, the disk 22 causes the attachment 20 to eventually bump against the stopper 18, preventing further motion. For at least a brief time, the electric motor 10 may continue driving the drive shaft against the mechanical end stop provided by the stopper 18 and attachment 20. A second stopper may also be provided to further limit motion in another direction. Various supporting elements, which would hold the drive shaft 12, stopper 18, attachment 20 and disk 22, among other elements, in alignment, are omitted in the figures for simplicity.

Various alternatives to this arrangement are known, for example, allowing the part being actuated (a valve, damper, or the like) to provide a physical end stop (for example, when the damper is closed and cannot move farther) for the actuator. Another is to provide a switch relative to the drive shaft that is actuated when the drive shaft reaches a desired position. Each of these solutions presents various difficulties, including complexity of installation, expense of additional parts, and (especially with some physical barrier-type end stops) fatigue and stress on parts that cause the end stop, as well as strain on the electric motor 10, drive shaft 12 and gears 14, 16. Better solutions are desired.

SUMMARY

The present invention, in an illustrative embodiment, includes a method for operating an actuator including providing a position sensor and using the position sensor to provide end-stop functionality for the actuator. For example, the actuator may have a motor controlled by control circuitry, with the control circuitry reading a variable from a position sensor to determine when the motor should be deactivated due to an associated actuated part reaching a motion limit.

In another illustrative embodiment, the present invention includes an actuator including a position sensor, a motor, and control circuitry. In the illustrative embodiment, the control circuitry may take an output from the position sensor and use the position sensor output to determine when to shut off the electric motor due to its encountering a motion limit, providing end stop functionality with reduced complexity and wear.

Another illustrative embodiment includes an HVAC damper adapted to include an actuator in accordance with the above illustrative example. Yet another illustrative embodiment includes a valve having an actuator in accordance with the above illustrative example.

BRIEF DESCRIPTION OF THE FIGURES

FIG. 1A is a diagram of an example mechanical end-stop system;

FIGS. 1B-1C are elevation views of the system of FIG. 1A in different positions;

FIG. 9 is a partial schematic for a user adjusted end-stop system embodiment;

FIG. 10A is a diagram of an illustrative example optical sensor based end-stop system; and FIG. 10B is a diagram for an alternative design for carrying indicia for an example optical sensor based end-stop system.

DETAILED DESCRIPTION

The following detailed description should be read with reference to the drawings. The drawings, which are not necessarily to scale, depict illustrative embodiments and are not intended to limit the scope of the invention. The inclusion of examples should be understood as purely illustrative, and does not limit the invention to those examples provided, or to use or inclusion of only those elements discussed or shown.

Figure 2:
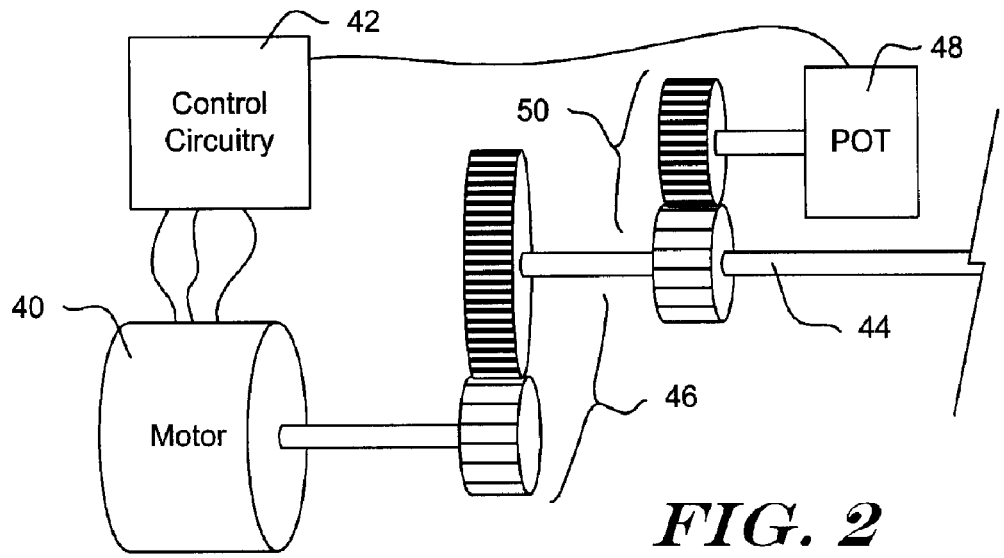
FIG. 2 is a diagram of an illustrative embodiment actuator.

FIG. 2 is a diagram of an illustrative embodiment actuator. In the illustrative embodiment, an electric motor 40 is controlled by control circuitry 42. The motor 40 is coupled to a drive shaft 44, optionally via gearing 46. The drive shaft 44 may be coupled to any suitable actuated part, including, for example, an air control damper as used in heating ventilation and air conditioning (HVAC) systems, or a valve used in controlling gas, steam, water, or other liquid, gas or fluid flow.

In the illustrative embodiment, a feedback potentiometer 48 is coupled to the drive shaft 44, sometimes via optional gearing 50. An output is taken from the feedback potentiometer 48 by the control circuitry 42. When used, the optional gearing 50 may be selected such that the dynamic range of the drive shaft 44 may be translated to less than (or equal to) the dynamic range of the potentiometer. For example, some known potentiometers are driven with a rotating unit having a wiper that is adapted for a dynamic range of less than 360 degrees. Depending upon how the drive shaft output is used with an actuated part, the drive shaft may have a dynamic range greater than that of the feedback potentiometer 48. Those of skill in the art will recognize that the gearings 46, 50 may be designed in a number of ways so that the dynamic range of the potentiometer is not exceeded when the actuator is at its desired end stop limits. The gearings 46, 50 may also be omitted in some embodiments, and/or may be secured relative the motor independent of the drive shaft 44.

Figure 3:
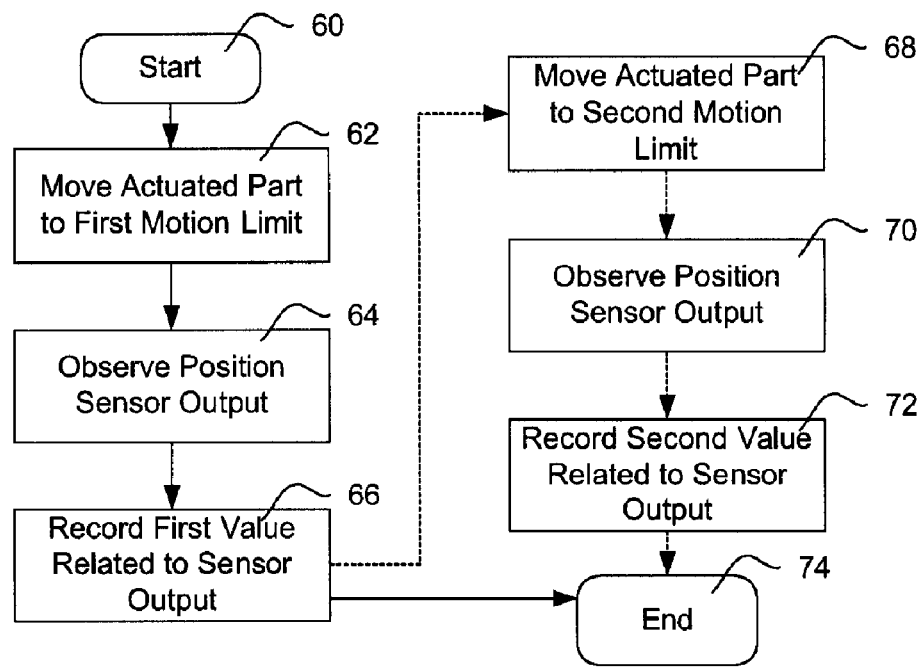
FIG. 3 is a block diagram for an illustrative method including initialization.

After an initialization, such as is shown in FIG. 3 below, the control circuitry 42 may store or otherwise have access to an indication of the output of the feedback potentiometer 48 when the actuated part (not shown) that is coupled to the drive shaft 44 is at an end-stop position. Then, by monitoring the output of the feedback potentiometer 48, for example, as shown below in FIGS. 7-9, the control circuitry is capable of stopping the electric motor 40 when an end-stop position is reached. This may include, for example, terminating a commutation sequence used to drive the motor 40, cutting off power to the motor 40, or other methods of shutting off the motor 40. It is understood that "taking an output" from a potentiometer, which is typically a passive device, may include applying a signal to the potentiometer and measuring a response to the signal.

The control circuitry may include a suitable processor such as a microprocessor, microcontroller or microcomputer. The control circuitry may also include timing devices, logic elements, power controlling circuitry, and input/output circuitry as are suitable for controlling the operation of the motor 40.

FIG. 3 is a block diagram for an illustrative method including initialization. From a start block shown at 60, the actuated part is moved (possibly by operation of the actuator's motor) to a desired first motion limit, as shown at 62. The first motion limit may be a position from which further motion in one direction is not desired. The position sensor output is then observed/measured, as shown at 64. Next, a first value related to the sensor output is recorded in some form, as shown at 66.

The first value may be recorded in digital or analog form, and on any suitable media or by the use of any suitable device/mechanism. For example, the value may be stored in a memory accessible by a microprocessor. In another example, an actuatable potentiometer controllable by the control circuitry may be adjusted to match or provide an indication of the stored first value. In yet another example, a voltage may be stored on a capacitor to indicate the stored first value.

After the first value is recorded in a suitable manner, the method may end, as shown at 74, or may go to step 68. This depends on whether a single end stop, or multiple end stops are desired. If the method continues to step 68, the actuated part is moved to a second motion limit. Next, as shown at 70, the position sensor output is again observed. As shown at 72, a second value related to sensor output, this time at the second motion limit, is recorded, in some manner. Again, the method ends at 74.

With the first, and optionally the second, value(s) stored or recorded, the actuator is now initialized to allow it to operate within one or both motion limits without a need for mechanical end-stops. Such mechanical or other end-stops may optionally be included for various purposes, including, for example, safety, but wear on those devices may be reduced since they will not always be used to provide an end-stop. For example, a mechanical or other end stop may be used in the initialization steps to allow the actuator to reach its physical end-stops during initialization, with the control methods discussed herein used after initialization.

In some embodiments, the first value (and, optionally, the second value) that is actually stored may be adjusted by an offset from the variable measured from the position sensor. This adjustment may occur before the value is stored, or when the value is used later. The offset may be chosen to allow the motor to be deactivated just before the actuated part reaches its desired end stop position or, if provided, its physical end stop. The variable may be in range of the first value (and optionally the second value) when the two are equal, or when the variable is equal to the first value plus or minus an offset. The same may be said of the second value as well.

In another illustrative embodiment, more points than just the end stops may be defined. In an illustrative example, a damper having four positions (closed, one-third open, two-thirds open, fully open) is actuated. Values for stopping points for the damper actuator may be stored for each of the four positions. In operation, the control circuitry may determine whether a variable measured from the position sensor is within an appropriate range between first and second endpoint values for that range, and continues operation until one of the endpoint values is reached or approached.

Figure 4:
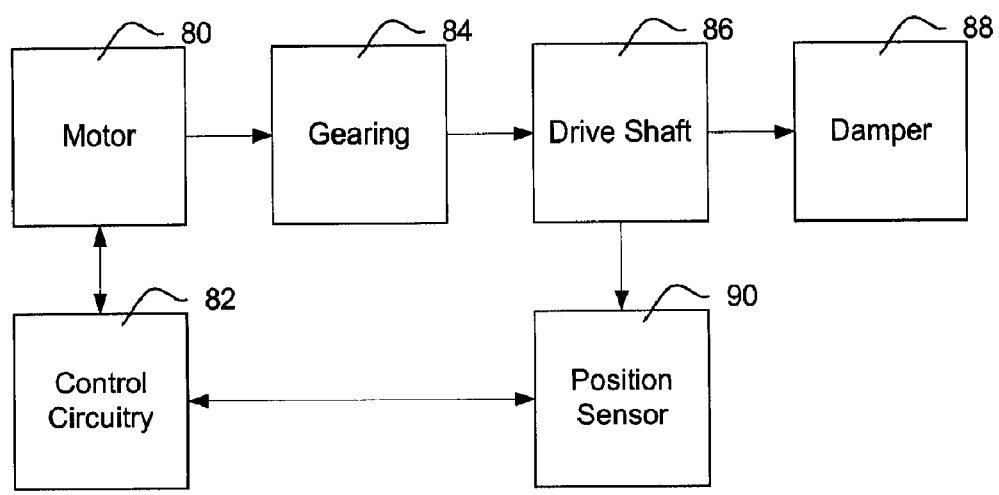
FIG. 4 is a functional block diagram of an illustrative damper.

FIG. 4 is a functional block diagram of an illustrative damper. The damper may include an electric motor 80, which is controlled by control circuitry 82. The motor 80 is coupled via (optional) gearing 84 to a drive shaft 86 that in turn is coupled to a damper 88 that may be, for example, an air flow control damper used in an HVAC system. In the illustrative damper, a position sensor 90 is coupled to the drive shaft 86, possibly through optional gearing, if desired. In some embodiments, the position sensor 90 may be an optical device that is coupled optically to the drive shaft 86, which may include readable indicia associated therewith, provided thereon, or provided on a device coupled via gearing to the drive shaft 86. In yet another embodiments, the position sensor 90 may take the form of a magnetic device that reads position by noting the passage of one or more magnetic elements past, for example, a Hall sensor. In another alternative, the drive shaft 86 is directly coupled to the potentiometer, for example with an actuator that operates the drive shaft 86 through a ninety-degree turn. The position sensor 90 predicts the position of the damper 88, and an output taken from the position sensor 90 is used by the control circuitry 82 to determine when the motor 80 should be shut off because the damper 88 has reached a motion limit or end stop.

Figure 5:
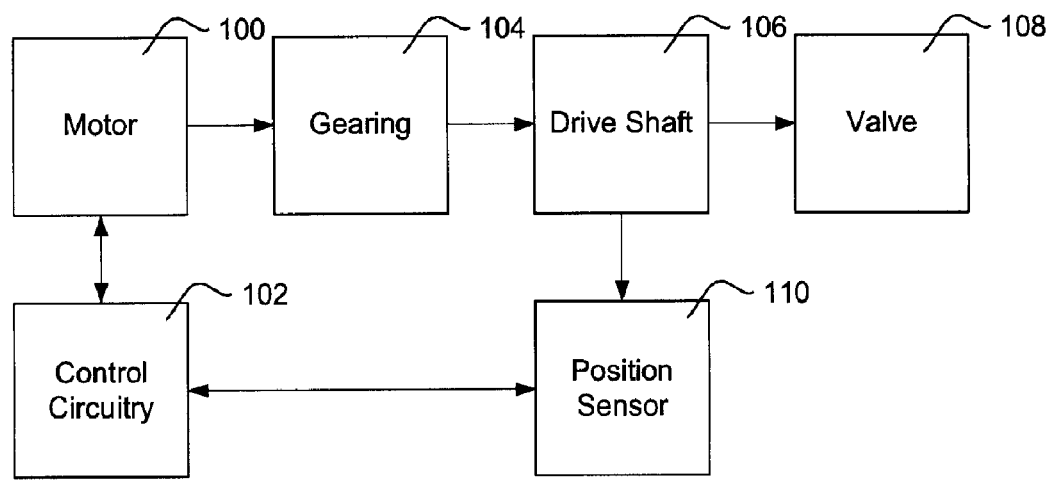
FIG. 5 is a functional block diagram of an illustrative valve.

FIG. 5 is a functional block diagram of an illustrative valve. The valve may include an electric motor 100, which is controlled by control circuitry 102. The motor 100 is coupled via (optional) gearing 104 to a drive shaft 106 that in turn is coupled to a valve 108 that may be, for example, a valve used to control gas, steam, water, or other liquid, gas, or fluid flow. In the illustrative example, a position sensor 110 is coupled to the drive shaft 106, possibly through optional gearing, if desired. Alternatively, the position sensor 110 may be an optical device or magnetic sensing apparatus as discussed above. The position sensor 110 predicts the position of the valve 108, and an output taken from the position sensor 110 is used by the control circuitry 102 to determine when the motor 100 should be shut off because the valve 108 has reached a motion limit or end stop.

Figure 6:
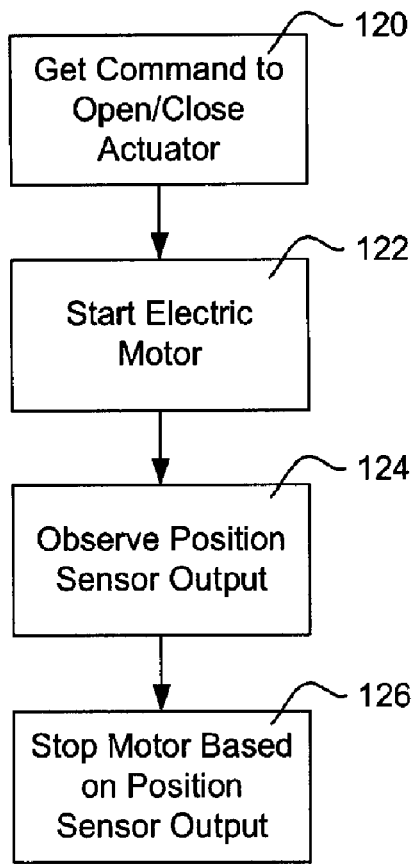
FIG. 6 is a block diagram for an illustrative method of operation.

FIG. 6 is a block diagram for an illustrative method of operation. In the example method, a first step is to receive a command to open or close the part, as shown at 120. Next, the electric motor is started, as shown at 122. Before starting the electric motor, the method may optionally include checking whether the actuated part is already at an end stop. The position sensor output is observed, as shown at 124. Finally, the motor is stopped based on an output from the position sensor, as shown at 126. The method is in contrast to conventional methods where a mechanical end-stop is provided and the motor is stopped due to increased force or load, sometimes beyond that which the motor can provide, for example. The actuated part may be, for example, a valve or a damper, or any other suitable device.

Figure 7:
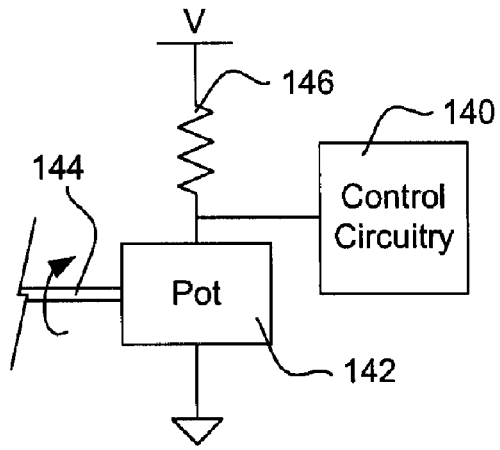
FIG. 7 is a partial schematic for another embodiment of an end-stop system.

FIG. 7 is a partial schematic view of another embodiment of an end-stop system. In the illustrative example, control circuitry 140 reads a voltage form a location between a potentiometer 142, coupled to drive shaft 144, and a resistor 146. The potentiometer 142 and resistor 146 are shown in a voltage divider configuration from an applied voltage V, which may be provided by the control circuitry 140, or in any other suitable manner. The resistance of the potentiometer changes as the drive shaft 144 rotates. As the resistance provided by the potentiometer 142 changes, the voltage read by the control circuitry 140 will change as well. Thus, the voltage sensed by the control circuitry 140 may provide an indication of the current position of the actuator or actuated part. The voltage may be sensed, for example, using analog-to-digital circuitry, or some other type of sampling circuitry.

Figure 8:
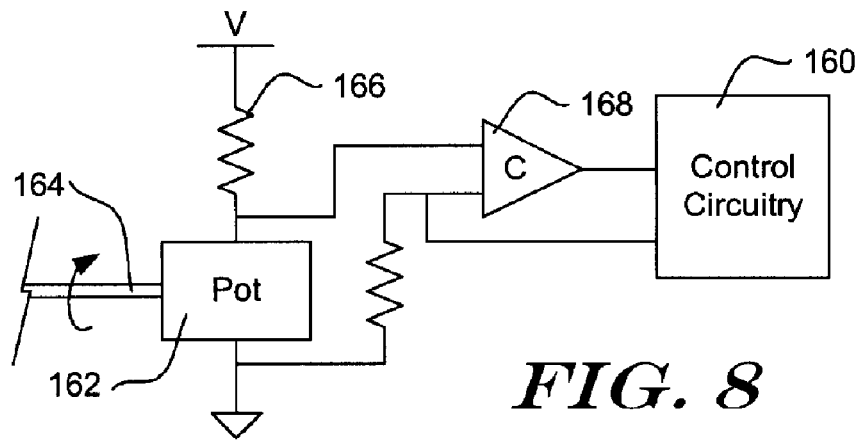
FIG. 8 is a partial schematic for yet another embodiment of an end-stop system.

FIG. 8 is a partial schematic for yet another embodiment of an end-stop system. In this example, the control circuitry 160 provides an output voltage to help in determining whether the potentiometer 162, again coupled to the drive shaft 164, indicates an end-stop position. Again, and for illustrative purposes, the potentiometer 162 is provided in a voltage divider configuration with a resistor 166, using a voltage V. This time, an output voltage is provided by the control circuitry 160 to a comparator 168, and compared to the voltage from the voltage divider.

For example, if a microprocessor is part of the control circuitry 160, the microprocessor may provide a digital output for digital-to-analog conversion. Any other suitable devices may be used to provide an output signal indicative of an earlier stored value captured during initialization. When the comparator 168 switches either from high-output to low-output, or low-output to high-output, the potentiometer 162 will be reading a position from the drive shaft 164 indicating that the actuated part is at an end stop. The control circuitry 160 then shuts down the motor. To initialize such a system, the control circuitry 160 may also have a coupling (not shown) to the node between resistor 166 and the potentiometer 162 for use in reading a voltage during initialization. believing FIG. 9 is a partial schematic for a user adjusted end-stop system embodiment. The example is similar to that shown in FIG. 7, with control circuitry 180 coupled to a node between a potentiometer 182, which is coupled to drive shaft 184, and a resistor 186. In addition to the voltage divider, the illustrative circuit includes a user adjustable potentiometer 188, which is adjustable by user input 190, such as a knob or other apparatus allowing user access and adjustment. In an illustrative example, when an actuator has been used for some period of time, there may be small changes in the positioning that occurs at the predetermined end stops saved by the control circuitry 180. Rather than reinitializing the actuator, the user may adjust the voltage measured by the control circuitry by adjusting a value on the user adjustable potentiometer 188 in one direction or another to further the motion limit.

FIG. 10A is a diagram of an illustrative example optical sensor based end-stop system. In this system, the control circuitry 200 is coupled to an optical sensor 202. The drive shaft 204 is coupled to a patterned piece 206, which the optical sensor 202 is disposed and adapted to read. Again, for initialization, the actuated part is placed at a desired end-stop position, and the optical sensor 202 takes a reading from the patterned piece 206 coupled to the drive shaft. The output of the optical sensor 202 is taken by the control circuitry 200 and saved in any suitable form for later comparison to the output of the optical sensor. If/when the output of the optical sensor 202 matches or nears the saved value, the control circuitry 200 is adapted to stop an associated electric motor (not shown). In some embodiments, the associated electric motor is stopped by simple deactivation (by removing power, for example), such that "stopping" the motor does not necessarily imply or exclude application of a brake or the other forced stopping mechanism.

FIG. 10B is a diagram for an alternative design for carrying indicia for an example optical sensor based end-stop system. Rather than the disk shown as the patterned piece 206 (FIG. 10A), a drum or cylinder 210 is placed over the drive shaft 212. The pattern may also be placed directly on the drive shaft. In some optical embodiments, a number of rotations may be counted, rather than an absolute position, with the number of rotations indicative of position. For example, an up/down counter may be used to count rotations occurring in one direction (up) or another (down), with the control circuitry adapted to recognize whether the applied signal that powers the motor will cause movement in one or the other direction.

The pattern or indicia suggested in FIGS. 10A and 10B may take any suitable form. Such readable indicia are known in various forms and are used in various technical areas. If expense is an issue, the potentiometer solutions suggested herein may be less expensive than an optical approach, however, as technologies progress the optical solution may become less expensive.

In yet another embodiment, a magnetic sensor including, for example, a Hall sensing device, may be used to count positions or rotations. For example, a cylinder carrying a number of magnets, disposed in alternating fashion, may be coupled (directly or via gearing) to the drive shaft and/or motor. Relative position may be determined by counting the number of times an associated Hall effect sensor is actuated.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of providing end stop functionality to an HVAC valve or damper, the HVAC valve or damper comprising an electric motor, a controller controlling the electric motor, and an output portion transferring force from the electric motor to an actuated part of the HVAC valve or damper, the method comprising:

providing a position sensor associated with the output portion, the position sensor providing an indication of a position of the actuated part of the HVAC valve or damper, and wherein the position sensor includes a position potentiometer;

selecting a first position for the actuated part of the HVAC valve or damper, the first position associated with one of an open, on, off, or closed position for the actuated part;

detecting an output of the position sensor when the actuated part of the HVAC valve or damper is at the first position;

storing a first value related to the output of the position sensor when the actuated part of the HVAC valve or damper is in the first position;

activating and operating the electric motor to actuate the HVAC valve or damper;

while operating the electric motor, observing the output of the position sensor and generating a variable related to the output of the position sensor;

comparing the variable to the first value, and, if the variable and the first value are within a range of one another, stopping movement of the actuated part of the HVAC valve or damper;

providing a user adjustable potentiometer, the user adjustable potentiometer electrically coupled to the position potentiometer and accessible and adjustable by a user of the actuator, the user adjustable potentiometer adjustable to provide adjustments to the variable when the actuator is at a given position; and observing a location of the actuated part of the HVAC valve or damper after the electric motor has been deactivated, and, if the actuated part of the HVAC valve or damper is not at an end point for motion of the actuated part of the HVAC valve or damper, adjusting the user adjustable potentiometer.

* * * * *